(12) United States Patent
Larkin

(10) Patent No.: US 11,320,549 B2
(45) Date of Patent: May 3, 2022

(54) VIBRATING PIPE LOCATOR

(71) Applicant: Carl Israel Larkin, Henderson, NV (US)

(72) Inventor: Carl Israel Larkin, Henderson, NV (US)

( * ) Notice: Subject to any disclaimer, the term of this patent is extended or adjusted under 35 U.S.C. 154(b) by 0 days.

(21) Appl. No.: 16/881,561

(22) Filed: May 22, 2020

(65) Prior Publication Data

US 2021/0364665 A1  Nov. 25, 2021

(51) Int. Cl.
*G01V 1/00* (2006.01)
*G01V 1/155* (2006.01)

(52) U.S. Cl.
CPC ..................... *G01V 1/155* (2013.01)

(58) Field of Classification Search
USPC .......................................................... 367/189
See application file for complete search history.

(56) References Cited

U.S. PATENT DOCUMENTS

| | | | | |
|---|---|---|---|---|
| 3,508,436 A * | 4/1970 | Krautkramer | ........ | G01N 29/265 73/637 |
| 3,967,194 A * | 6/1976 | Beaver | ................... | G01N 27/82 324/220 |
| 4,102,206 A * | 7/1978 | Perdijon | ................ | G01N 29/28 73/644 |
| 4,625,165 A * | 11/1986 | Rothstein | ............... | G01B 7/281 324/220 |
| 4,747,317 A * | 5/1988 | Lara | ....................... | G01C 21/16 73/865.8 |
| 4,799,391 A * | 1/1989 | Lara | ....................... | E21B 47/022 33/302 |
| 4,945,775 A * | 8/1990 | Adams | .................... | G01N 29/07 73/865.8 |
| 5,442,826 A * | 8/1995 | Murata | .................. | B08B 9/0325 15/104.062 |
| 7,474,092 B1 * | 1/2009 | Kwun | ................... | G01N 29/043 324/238 |
| 8,261,623 B2 * | 9/2012 | Miller | ...................... | F16L 55/48 73/865.8 |
| 9,080,708 B2 * | 7/2015 | Early | ....................... | F16L 1/235 |
| 9,138,786 B2 * | 9/2015 | McKay | .................... | B08B 9/055 |
| 2003/0233894 A1 * | 12/2003 | Tezuka | .................... | G01B 7/281 73/865.8 |

(Continued)

FOREIGN PATENT DOCUMENTS

| | | | | |
|---|---|---|---|---|
| EP | 242947 A | * | 7/1992 | ............. G01N 27/90 |
| JP | H09274021 A | * | 10/1997 | |

OTHER PUBLICATIONS

English Machine Translation of JP-H09274021-A (Year: 1997).*

*Primary Examiner* — James R Hulka
(74) *Attorney, Agent, or Firm* — Messner Reeves LLP

(57) ABSTRACT

A device for identifying the location of pipe is disclosed. The device includes a motor shaft attached at one end to a motor and attached at the other end to a weight; a flexible push rod attached at one end to a tip assembly and attached at the other end to a reel; a power source for powering the motor; and a tip assembly. The tip assembly is threaded into one end of a pipe. As the motor turns the motor shaft, the motor shaft causes the weight to oscillate. As the weight oscillates it causes the tip assembly to vibrate. As the tip assembly vibrates it emits auditory sounds.

18 Claims, 4 Drawing Sheets

(56) References Cited

U.S. PATENT DOCUMENTS

| | | | | |
|---|---|---|---|---|
| 2004/0261547 | A1* | 12/2004 | Russell | G01N 29/11 |
| | | | | 73/865.8 |
| 2005/0283276 | A1* | 12/2005 | Prescott | E21B 47/135 |
| | | | | 700/282 |
| 2009/0013806 | A1* | 1/2009 | Miller | F16L 55/48 |
| | | | | 73/865.8 |
| 2009/0021253 | A1* | 1/2009 | Kwun | G01N 29/226 |
| | | | | 324/238 |
| 2012/0255933 | A1* | 10/2012 | McKay | B08B 9/055 |
| | | | | 219/61 |
| 2014/0023440 | A1* | 1/2014 | Early | F16L 57/02 |
| | | | | 405/168.2 |
| 2014/0283876 | A1* | 9/2014 | Fjerdingstad | B08B 9/0535 |
| | | | | 134/8 |

* cited by examiner

VIBRATING PIPE LOCATOR

CROSS-REFERENCE TO RELATED APPLICATIONS

This application claims priority to provisional application U.S. 62/830,600.

TECHNICAL FIELD

This application relates to devices for locating pipes, and more particularly to auditory locating devices.

BACKGROUND

In constructing new homes, remodeling homes, and even in commercial construction, unexposed electrical, plumbing, and HVAC pipes are located within the construction. The unexposed piping can be a challenge to work with because it is not always known what pipes are connected and where pipe lead. Tracing a pipe saves from having to excavate flooring, open ceilings and walls or crawl around small, inconvenient access areas.

SUMMARY

In a first aspect, the disclosure provides a device for identifying the location of pipe. The device includes a motor shaft attached at one end to a motor and attached at the other end to a weight; a flexible push rod attached at one end to a tip assembly and attached at the other end to a reel; a power source for powering the motor; and a tip assembly. The tip assembly is threaded into one end of a pipe. As the motor turns the motor shaft, the motor shaft causes the weight to oscillate. As the weight oscillates it causes the tip assembly to vibrate. As the tip assembly vibrates it emits auditory sounds.

In a second aspect the disclosure provides a method for identifying the location of pipe. The method includes providing a motor shaft attached at one end to a motor and attached at the other end to a weight; providing a flexible push rod attached at one end to a tip assembly and attached at the other end to a reel; providing a power source for powering the motor; and providing a tip assembly. The tip assembly is threaded into one end of a pipe. As the motor turns the motor shaft, the motor shaft causes the weight to oscillate. As the weight oscillates it causes the tip assembly to vibrate. As the tip assembly vibrates it emits auditory sounds.

Further aspects and embodiments are provided in the foregoing drawings, detailed description, and claims.

BRIEF DESCRIPTION OF THE DRAWINGS

The drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
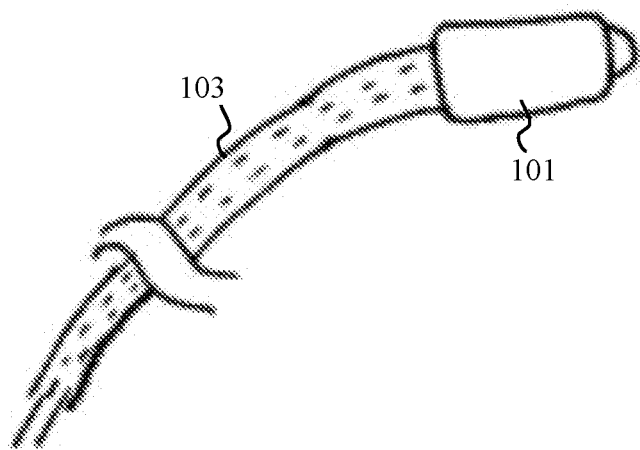
FIG. 1 is a view of one embodiment of the tip assembly of the pipe locator.

The following description recites various aspects and embodiments of the inventions disclosed herein. No particular invention is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly indicates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly expressly indicated, such examples are provided only to aid in understanding embodiments illustrated in the present disclosure and are not meant to be limiting in any fashion. Nor do these phrases indicate any kind of preference for the disclosed embodiment.

As used herein "pipe" is meant to refer to electrical, plumbing, and HVAC pipes. Each of the connections are hollow tubes through which the water, sewage, air, or wires will pass.

Tracing and locating unexposed electrical, plumbing, and HVAC piping is needed during new construction, remodeling and repairs of homes and commercial buildings. Tracing a pipe saves from having to excavate flooring, open ceilings and walls or crawl around small, inconvenient access areas. Existing pipe locators use frequency receivers to locate electronic frequencies produced from frequency emitters, such as a 512 MHz sonde, inserted into a pipe on a push rod or by energizing entire metallic pipe line sets, or tracing wires ran along non-metallic pipes, with a similar electrical frequency. Another method of tracing pipes is pneumatic "thumping," where loud pressures and sounds are injected into an open end of a pipe and then locating with a stethoscope where sound is hopefully heard.

Energizing metallic pipes or tracing wires will produce an electrical frequency on any and all metallic objects that come in contact with the desired pipe and can be indistinguishable by the operator's receiving equipment. The operator could be following a nuisance signal (an undesired signal picked up by a frequency receiver) and could incur heavy costs if mistakenly opening a wall or excavating the wrong area. Locating a pipe with a sonde is limited by the size of the sonde, which is generally large. Both electronic frequency locators are limited to the type of material they are passing through. For example, a low MHz frequency emitter will not travel, and cannot be located, through metallic or dense materials, such as steel framing, copper pipe, or even concrete. These popular signal producers and signal receivers are complex and require hours of training and experience to use reliably. These methods bring high equipment costs, training, and unreliability due to nuisance frequencies from common nearby electrical signals from TV cables, internet, power lines, and low-voltage control wires. Pneumatic thumping is not popular because the pressures can damage the piping and locating the noise within a pipe is difficult due to materials around the pipe being located.

This invention is broken into two parts: the push rod and the vibrating motor head. The push rod is a narrow semi-rigid material that can be formed long and thin, such as fiberglass or nylon. The push rod is the mechanism used to push the vibrating motor into and through a pipe, cavity or conduit and also to retrieve it by pulling it back out. The goal is to guide the attached vibrating motor to a location where it can be energized and found. It is necessary that the push rod be rigid enough to not fold over itself while being fed into the pipe and yet flexible to go around bends like an electrician's fish tape. Small diameter (around 7 mm) push rods can be stored within a coiled or plastic reel, similar to an electrician's fish tape. Larger push rods can be stored on reels used for sewer cleaning rods and cameras.

The vibrating motor head is created by attaching an offset weight to an electrical motor shaft and placing it within an enclosure. The vibrating motor head is attached to the push rod by any means, including but not limited to; tape, glue, shrink wrap, crimping of a hole within the vibrating motor head with the push rod inserted into, or an adapter designed to grasp both the motor and the push rod. A vibrating motor head can be made by one of many methods but an offset weight is the most common vibrating motor type which is an electric motor with an uneven weight connected to the shaft that rotates while the motor is running. An example of a weight's shape can be a circular sector with a 90° quadrant center angle with enough thickness to create a mass to cause the whole electric motor to move as the shaft rotates around the inner arc, where attached to the shaft.

The electric motor can be powered by internal batteries or power ran within or parallel to the push rod. The vibrating motor and all electronics will be enclosed with a waterproof and durable material such as stainless steel or plastic. The motor enclosing will completely surround the electronics and will extend beyond to allow full-motion of the rotating offset weight. If the vibrating motor is mounted at the end of the push rod then it will have a dome shape to allow forcible pushing of the push rod to guide around turns. If the vibrating motor is mounted elsewhere on the push rod then the end of the push rod will require a rounded shape to allow similar movement through turns and obstacles.

When the motor is energized the shaft will rotate quickly and cause the weight to oscillate and shake as the shaft rotates. The oscillation creates an audible sound. This audible sound is generally characterized as a humming sound. Additionally, the oscillation creates a chattering where the vibrating motor housing taps against the walls of the pipe. After pushing the vibrating motor head into the pipe, while energized, the operator can walk the property and listen for humming or ringing from the vibrating motor head. When the general area is found, the operator can place his hand around where the noise seems to come from to further narrow down where the vibrating motor head is located. The sound and vibrations grow louder as the operator gets closer to the vibrating motor head. The operator can also use listening equipment such as a stethoscope or other noise amplifier if needed.

Now referring to FIG. 1 which shows one embodiment of the vibrating pipe locator. When remodeling a home or updating the plumbing in a home it is preferable to find the pipes and map their locations, than to tear out walls, floors, and ceilings. The vibrating pipe locator assists in finding where pipes run and mapping their locations and connections. The pipe locator is pushed through an exposed end of a pipe to identify where the pipe connects. The vibrating head assembly 101 is attached or mounted to the end of the push rod 103. In some embodiments, the vibrating head assembly 101 has a tapered shape to enable it to pass through the pipes and turn corners where necessary. The push rod 103 is constructed of a semi-rigid material, which is strong and stiff enough to push, without folding over or coiling up, and yet flexible enough to turn corners and move around bends in the pipes. In one embodiment, the push rod is made of nylon. In another embodiment, the push rod is made of fiberglass. In yet another embodiment, the push rod is made of steel. In embodiments where the push rod is constructed of steel it is preferably stainless steel.

Figure 2:
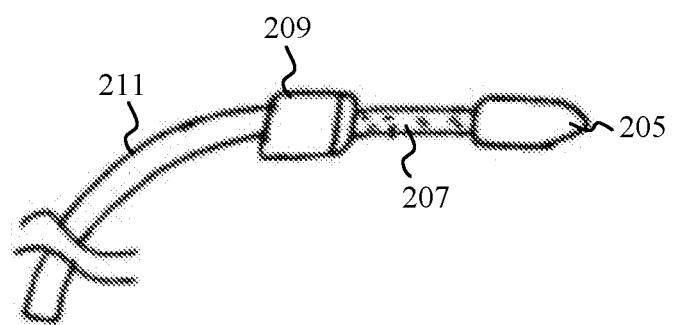
FIG. 2 is a view of an embodiment with an extendable tip assembly.

Referring now to FIG. 2, which shows another embodiment of a vibrating pipe locator. The tip assembly 205 of the push rod is rounded or dome shaped to allow easier pushing of the pipe locator through the pipe. The tip can extend from the electric motor housing 209. The extended portion has an inner push rod 207 which fits inside the outer push rod sleeve 211. The electric motor housing 209 holds the electric motor. In the embodiment, with the extendable portion the electric motor housing holds the electric motor. The inner push rod 207, electric motor housing 209, and tip assembly are all constructed so as to be waterproof. It is especially important for the electric motor to function in many environments, including environments that would ordinarily be detrimental to the functioning of the motor. Thus it is important for the motor to be kept from water and other contaminants.

Figure 3:
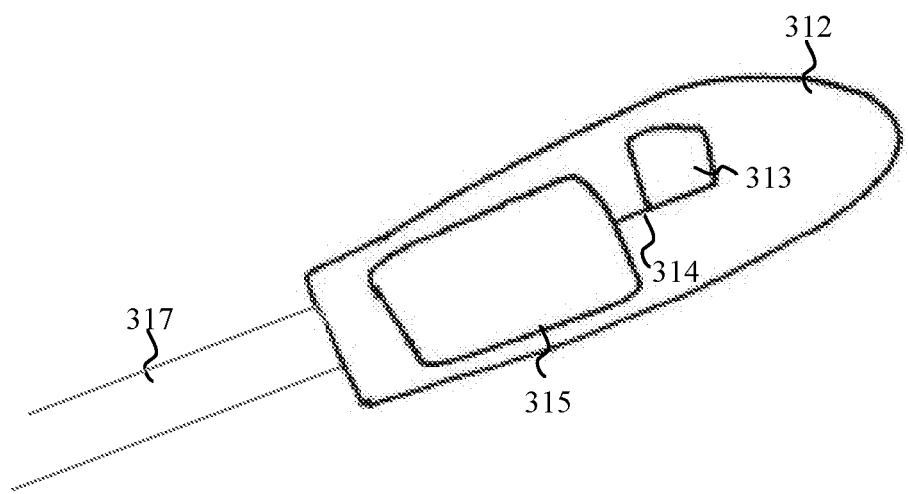
FIG. 3 is an internal view of the tip assembly.

Referring to FIG. 3 which shows an embodiment depicting one method for causing the tip to vibrate. The tip enclosure 312 is rounded to assist the tip in turning corners and going around bends as the push rod 317 pushes the tip through the pipe. Within the tip 312 is a weight 313. The weight is attached to the motor shaft 314. The motor shaft attaches to the electric motor 315. The motor housing and tip are attached to the end of the push rod. When the electric motor is turned on the motor shaft turns. As the motor shaft turns, the weight attached to the end of the shaft oscillates. The oscillation of the weight causes an audible humming sound. Additionally, the oscillation of the weight causes the tip to hit the sides of the pipe and create audible sounds as well as physical vibrations. The audible sounds can be heard by the user and the vibrations can be felt by the user and assist in finding the location of the pipe. Additionally, the vibration can be felt by the user. This gives the user two methods for determining the location of the pipe. The tip enclosure is constructed of waterproof materials and constructed so as to be waterproof. In some embodiments, the tip enclosure is made of steel, preferably stainless steel. In other embodiments, the tip enclosure is constructed of plastic.

Figure 4:
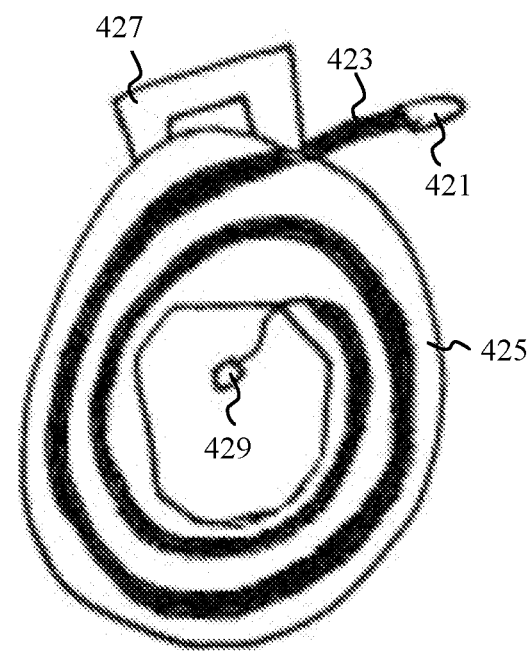
FIG. 4 is an internal view of the housing of the device.

Referring to FIG. 4 which shows an interior view of a vibrating pipe locator device. A housing 425 holds a mechanism for winding up and storing the push rod 423. A handle 427 is attached to and integrated into the housing. The housing protects and stores the push rod, which requires the housing to be constructed of a material that will protect the push rod. A tip housing 421 is attached to the push rod. As the device is to be carried to locations for use, it is preferable that the device be lightweight. In some embodiments, the housing is constructed of plastic. In other embodiments the housing is constructed of metal. Lightweight metals such as aluminum and aluminum alloys are the preferred metals. In other embodiments, steel, stainless steel, or titanium is used.

The device utilizes a powered motor, and as such needs a method for powering the motor. In the preferred embodiment batteries are used to power the electric motor. In many embodiments, a battery pack 429 is located in the center of the housing 425. In some embodiments, the battery is located in the tip housing. In embodiments that includes a motor housing, the batteries are located in the motor housing. In alternative embodiments, the power is supplied through an electric cord.

Additionally, within the housing is a mechanism for spooling the push rod 423 and unspooling the push rod 423. In some embodiments, the spooling mechanism is a manual spooling mechanism. The manual mechanism includes a handle for turning the winding and unwinding mechanism. In some embodiments, the winding and unwinding mechanism is spring loaded, which allows the push rod to be wound up by pulling on the push rod. In yet, other embodiments the winding and unwinding mechanism is motorized.

Figure 5:
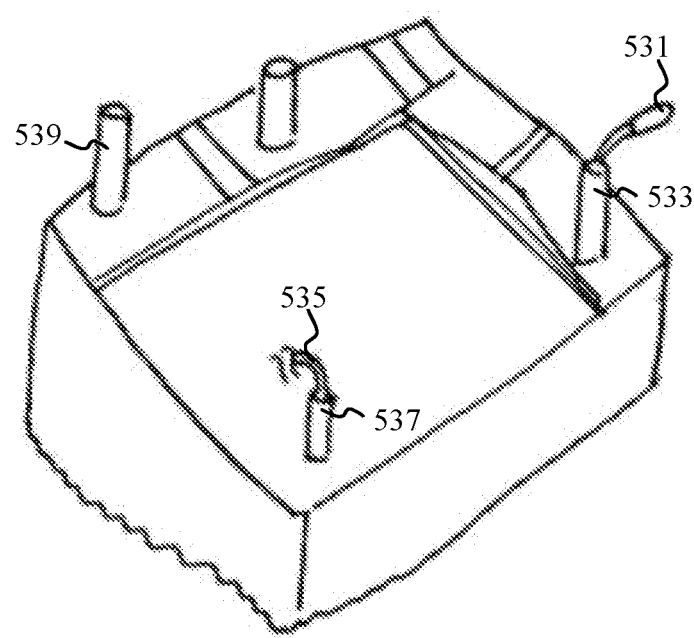
FIG. 5 is a view of the device being threaded through a pipe to discover where it connects to other pipes.

Referring now to FIG. 5 which is an example of the device being used to locate the end of a pipe. The tip assembly is fed through pipe 537. The push rod 535 feeds the tip assembly through the pipes. It is not known by the user which pipe connects to the feed pipe 537, the pipe 537 could connect to pipe 539 or could connect to pipe 533. As the push rod pushes the tip assembly through the pipe it comes out through pipe 533. This indicates that pipe 533 is connected to the pipe 537.

Figure 6:
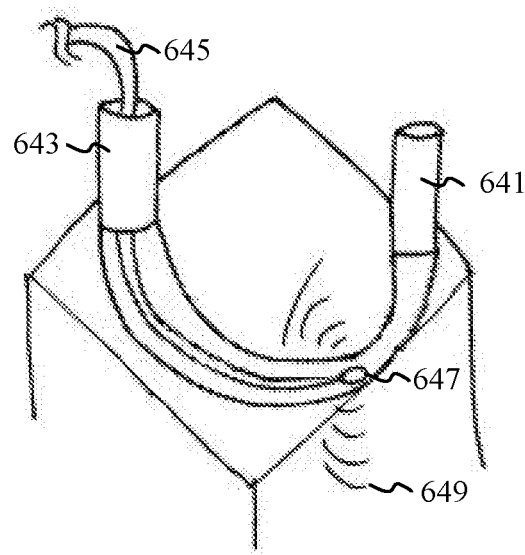
FIG. 6 is a view of the tip vibrating to produce audible sounds.

Referring to FIG. 6 which is a view of the pipe locator vibrating in the pipe to identify the pipes that connect together. The tip assembly 647 is threaded through pipe 643. Once the tip assembly 647 is threaded into the pipe 643 the electric motor is activated and the tip begins to vibrate. As the tip vibrates it creates a humming sound. In addition as the tip impacts the walls of the pipe it causes additional audible sounds 649. Both the sound generated from the tip itself and the sounds of the tip impacting the walls of the pipe alert the user to the location of the tip and therefore the location of the connecting pipe 641. While FIG. 6 shows a single pipe, multiple pipes are typically located within the area.

Figure 7:
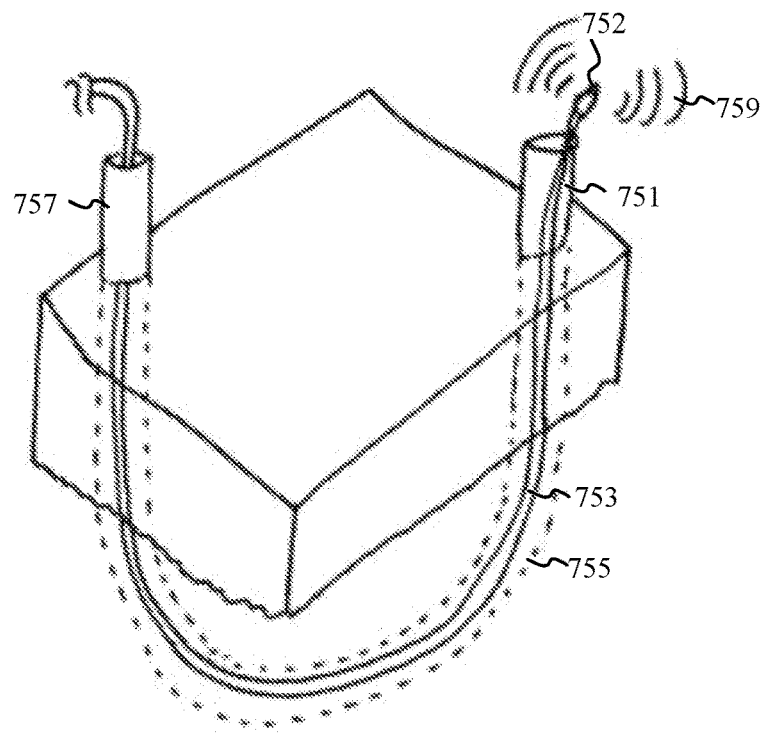
FIG. 7 is a view of the device vibrating to produce audible sounds to identify the pipes that connect.

Referring to FIG. 7 which is an example of the vibrating pipe locator identifying the pipes that connect together. The tip 752 has been inserted into pipe end 757 and threaded through pipe 755. The pipe 755 is concealed in the floors and walls. The pipe locator assists the user in finding the end of the pipe. As the push rod 753 is threaded through the pipe, the motor is turned on and the tip 752 vibrates which impacts the sides of the pipe and creates audible sounds 759. In addition to audible sounds the impacts to the sides of the pipe create vibrations which can be felt to assist in identifying the location of the pipe in the floor or walls.

Figure 8:
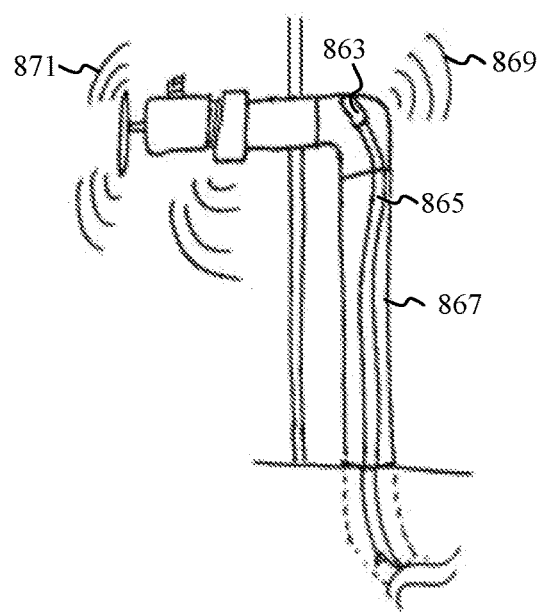
FIG. 8 is a view of the device vibrating to identify the pipes that connect.

Referring to FIG. 8 which is a view of the vibrating pipe locator being used to identify pipe connections. The push rod 865 pushed the tip 863 through the pipe 867. As the tip 863 is threaded through pipe 867 the motor is turned on and the tip vibrates. The vibrating tip comes in contact with the sides of pipe 867. The vibration of the tip 863 against the sides of pipe 867 causes the pipe to emit audible sounds 869 and 871. The vibrations of the tip 863 are also transferred throughout the pipe. A user can feel the vibrations in the pipe. The vibrations can be felt though the handles or through the pipes themselves.

All patents and published patent applications referred to herein are incorporated herein by reference. However, any reference to prior publication is not, and should not be taken as an acknowledgement, admission, or suggestion that the prior publication, or any information derived from it is part of the general common knowledge in the field of endeavor to which this specification relates. The invention has been described with reference to various specific and preferred embodiments and techniques. Nevertheless, it is understood that many variations and modifications may be made while remaining within the spirit and scope of the invention.

What is claimed is:

1. A device for identification of a location of a pipe, the device comprising:
    a push rod sleeve size to fit within the pipe;
    a push rod sized to fit within and slide through the push rod sleeve;
    a tip assembly attached to the push rod, wherein the tip assembly is size to fit within the pipe, the tip assembly including:
        a motor shaft attached at one end to a motor and attached at the other end to a weight;
        a power source for powering the motor,
        wherein, when the motor is powered, the motor turns the motor shaft to cause the weight to oscillate so that when the tip assembly is disposed within the pipe and the motor is powered, the oscillation of the weight causes the tip assembly to strike an interior surface of the pipe to create audible sounds and physical vibrations.

2. The device of claim 1, wherein the push rod is attached at one end to the tip assembly and attached at the other end to a reel.

3. The device of claim 2, further comprising a motor housing assembly.

4. The device of claim 3, wherein the tip assembly extends from the motor housing assembly.

5. The device of claim 2, wherein the push rod is unwound and wound by a powered reel.

6. The device of claim 1, wherein the power source is batteries.

7. The device of claim 6, wherein the batteries are located in the tip assembly.

8. The device of claim 1, wherein the tip assembly is waterproof.

9. The device of claim 1, wherein the device includes a power inlet to receive power for the motor.

10. A method, comprising:
    providing a tip assembly, the tip assembly including a motor shaft attached at one end to a motor and attached at the other end to a weight, wherein the motor is connected to a power source for powering the motor;
    attaching the tip assembly to a first end of a flexible push rod, wherein a second end of the flexible push rod is attached to a reel and the flexible push rod is disposed within a push rod sleeve;

introducing the tip assembly into a pipe by extending the flexible push rod through the push rod sleeve;

causing the power source to supply electric energy to the motor to cause the motor shaft to turn to cause the weight and the tip assembly to oscillate, wherein as the tip assembly oscillates the tip assembly impacts sides of the pipe causing the pipe to vibrate and to emit auditory sounds.

11. The method of claim 10, wherein the flexible push rod attached at one end to the tip assembly and attached at the other end to the reel.

12. The method of claim 11, wherein the motor is disposed within a motor housing assembly.

13. The method of claim 12, wherein the tip assembly extends from the motor housing assembly.

14. The method of claim 12, further comprising using a powered reel to at least one of wind and unwind the flexible push rod.

15. The method of claim 10, wherein the power source is batteries.

16. The method of claim 15, wherein the batteries are located in the tip assembly.

17. The method of claim 10, wherein the tip assembly is waterproof.

18. The method of claim 10, wherein the tip assembly includes a power inlet to receive power for the motor.

* * * * *